United States Patent [19]
McComber

[11] Patent Number: 5,984,819
[45] Date of Patent: Nov. 16, 1999

[54] BELT DRIVE DIFFERENTIAL

[75] Inventor: Donald R McComber, Littleton, Colo.

[73] Assignee: The Gates Corporation, Denver, Colo.

[21] Appl. No.: 08/902,406

[22] Filed: Jul. 29, 1997

[51] Int. Cl.[6] .............................. F16H 9/26; F16H 48/12
[52] U.S. Cl. ......................... 475/182; 74/650; 474/134
[58] Field of Search ........................... 474/84, 87, 148, 474/149, 134–138; 475/182, 220; 74/650

[56] References Cited

U.S. PATENT DOCUMENTS

| | | | |
|---|---|---|---|
| Re. 11,961 | 1/1902 | Creveling | 474/138 X |
| 813,433 | 3/1906 | Johnson | 474/138 X |
| 1,028,009 | 5/1912 | Fancher | 475/182 |
| 3,543,608 | 12/1970 | Meihak | 475/182 |
| 3,919,893 | 11/1975 | Boehm et al. | 74/650 |
| 5,390,753 | 2/1995 | Parker | 475/182 |
| 5,445,572 | 8/1995 | Parker | 475/182 |

Primary Examiner—Tamara L. Graysay
Assistant Examiner—Marcus Charles
Attorney, Agent, or Firm—C. H. Castleman, Esq.; S. G. Austin, Esq.; J. A. Thurnau, Esq.

[57] ABSTRACT

A belt drive differential with an output shaft, two planet sprockets rotatably mounted to a carrier to orbit in a circular path about a carrier axis coaxial with the output shaft, a first output sprocket attached to the output shaft, a second output sprocket coaxial with the output shaft, and a toothed power transmission belt connecting the sprockets.

11 Claims, 2 Drawing Sheets

५,९८४,८१९

1

BELT DRIVE DIFFERENTIAL

BACKGROUND OF THE INVENTION

The invention relates to planetary gear transmissions and components, but more particularly, the invention relates to a belt drive differential where a planet pinion engages a flexible belt.

In a belt drive differential, planet pinions in the form of pulleys are rotatably mounted to a carrier and orbited in a circular path about a carrier axis. Output pulleys arranged substantially coaxial with the carrier axis transmit power to shafting.

In a belt drive differential, two or more planet pulleys are rotatably mounted to a carrier and orbited in a circular path with the carrier about a carrier axis. Two output pulleys are arranged coaxial with the carrier axis and a belt bent in a circuitous path is entrained around and engages the planet pulleys and output pulleys which are in different planes. Such a drive with multi-plane pulleys is commonly known as a mule pulley drive.

In the belt differential disclosed in U.S. Pat. No. 3,543,608 to Meihak, coaxial planet V-pulleys are used in conjunction with a V-belt and output V-pulleys individually fixed to and near ends of separate shafts that are coaxial with the carrier axis. Ends of the two shafts are commonly journaled to the carrier and require additional journaling with thrust capability to prevent axial separation of the commonly journaled shaft ends and the fixed output V-pulleys. The position of the planet V-pulleys require periodic adjustments for "belt take up" by means of threaded fasteners to adjust belt tension and to compensate for belt wear. Summarily, the V-belt drive has limited power capability, requires intermittent belt take-up adjustments which has the effect of changing belt drive length to minimize V-belt slippage; and two shafts are required, one fixed to each of the two output pulleys.

In the belt differential disclosed in U.S. Pat. No. 5,445,572 to Parker, both non-coaxial frustoconcial and cylindrical planet pulleys are used in conjunction with a toothed synchronous belt and output sprockets individually fixed near ends of separate tubular gear shafts that are coaxial with the carrier axis and are journaled over a central or third coaxial shaft. The two tubular shafts require additional journaling with thrust capacity to prevent separation of the tubular shaft ends with fixed output sprockets. The position of the planet frustoconical pulleys and cylindrical pulleys require belt take-up adjustment for belt drive length to tension the belt to impede it from ratcheting on the output sprockets. A second set of frustoconical guide pulleys are also required juxtaposed the belt and opposite planet pulleys to help guide the belt and impede belt ratcheting. Summarily, the synchronous belt drive requires adjustment of the belt drive length to minimize belt ratcheting on the output sprockets; frustoconical rollers are required to impede belt movement that can cause belt ratcheting; and three shafts are required, one fixed to each of the tubular gear shafts and, a central shaft.

There are several major problems with the aforementioned belt drives. A major problem is that there is not a fixed or constant belt drive length. The position of the planet pulleys must be re-adjusted for belt take-up to obtain or change to a belt drive length where V-belt slipping or synchronous belt ratcheting is impeded.

Another problem with the prior art belt drive differentials is associated with the use of multiple output shafts. The output pulleys or sprockets are each connected to separate shafts. Special journaling with thrust capability is required to keep the output sprockets and pulleys in a position that does not impact belt drive length. The use of a third or central shaft introduces a problem of lubrication and fretting corrosion with the journaled tubular shafts.

A particular problem with the Parker '572 belt drive differential is that it uses planet pulleys as idlers that engage the tips of belt teeth to adjust belt drive length and define a curved surface about which belt bending is forced. The pulleys press against the tips of the belt teeth allowing the belt tensile member (i.e., cord) to bend at very small bending radii in areas between belt teeth which causes crimping of the belt's tensile member that is deleterious to belt life. The smaller the radius of the pulley, the shorter the belt life. The use of frustoconical pulleys is particularly deleterious to a cord tensile member because the belt must bend over various radii across its width as it presses against the frustoconical pulley.

A belt drive length is associated with the length of the belt's tensile member because belt bending takes place at the tensile member. Consequently, bending of a synchronous belt and its belt drive length cannot be precisely controlled by small diameter planet pulleys that press against tips of belt teeth.

SUMMARY OF THE INVENTION

In accordance with the invention, a belt drive differential is provided that is particularly useful in light duty applications such as golf carts, small tractors, and lawnmowers where it is desirable or necessary for at least two drive wheels to operate at different rotational speeds. The belt drive differential has at least one output shaft, two planet sprockets rotatably mounted to a carrier to orbit in a circular path about a carrier axis that is coaxial with the output shaft, and first and second output sprockets coaxial with the output shaft. The arrangement of the planet sprockets and the output sprockets define a mule pulley drive having a fixed length that does not need to be intermittently adjusted for belt take-up.

In a preferred arrangement, the first output sprocket is attached to the output shaft and the second output sprocket is journaled to the output shaft. A first drive pulley is attached to the output shaft and a second drive pulley is journaled to the output shaft and attached to the second output pulley to rotate therewith. A toothed belt is entrained around the planet sprockets and output sprockets to complete the drive. The advantage of this arrangement is that a single output shaft is used which has the advantage of help maintaining a fixed belt drive length and the shaft helps to provide excellent alignment for the belt of the mule pulley drive.

These and other advantages of the invention will be apparent after reviewing the drawings and description thereof wherein:

FIG. 1 is an isometric view of the belt drive differential of the invention and further includes schematics of portions of optional belt drives; and FIG. 2 is a cross sectional view taken along the line 2—2 of FIG. 1.

DESCRIPTION OF PREFERRED EMBODIMENT

Figure 1:
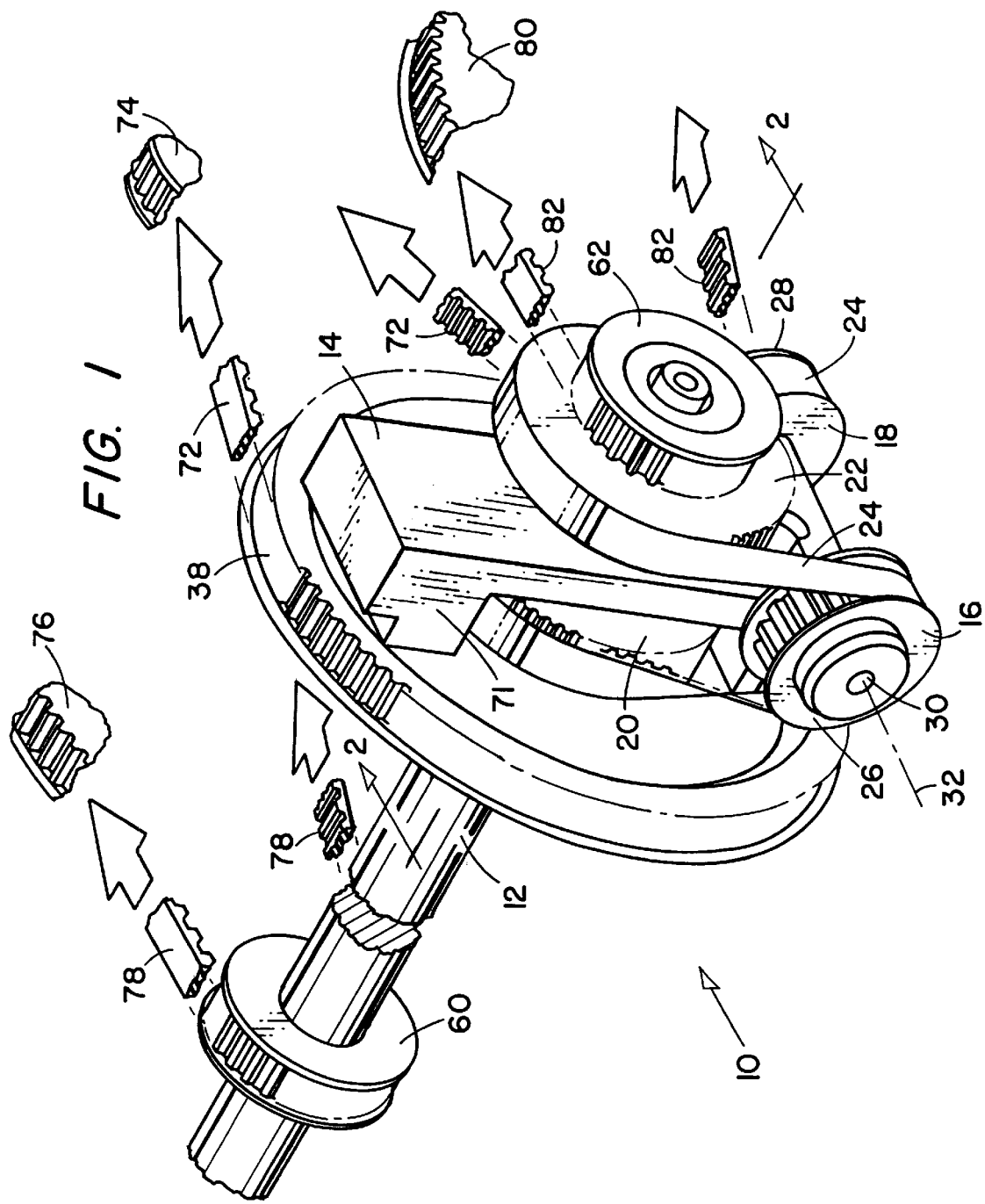
Figure 2:
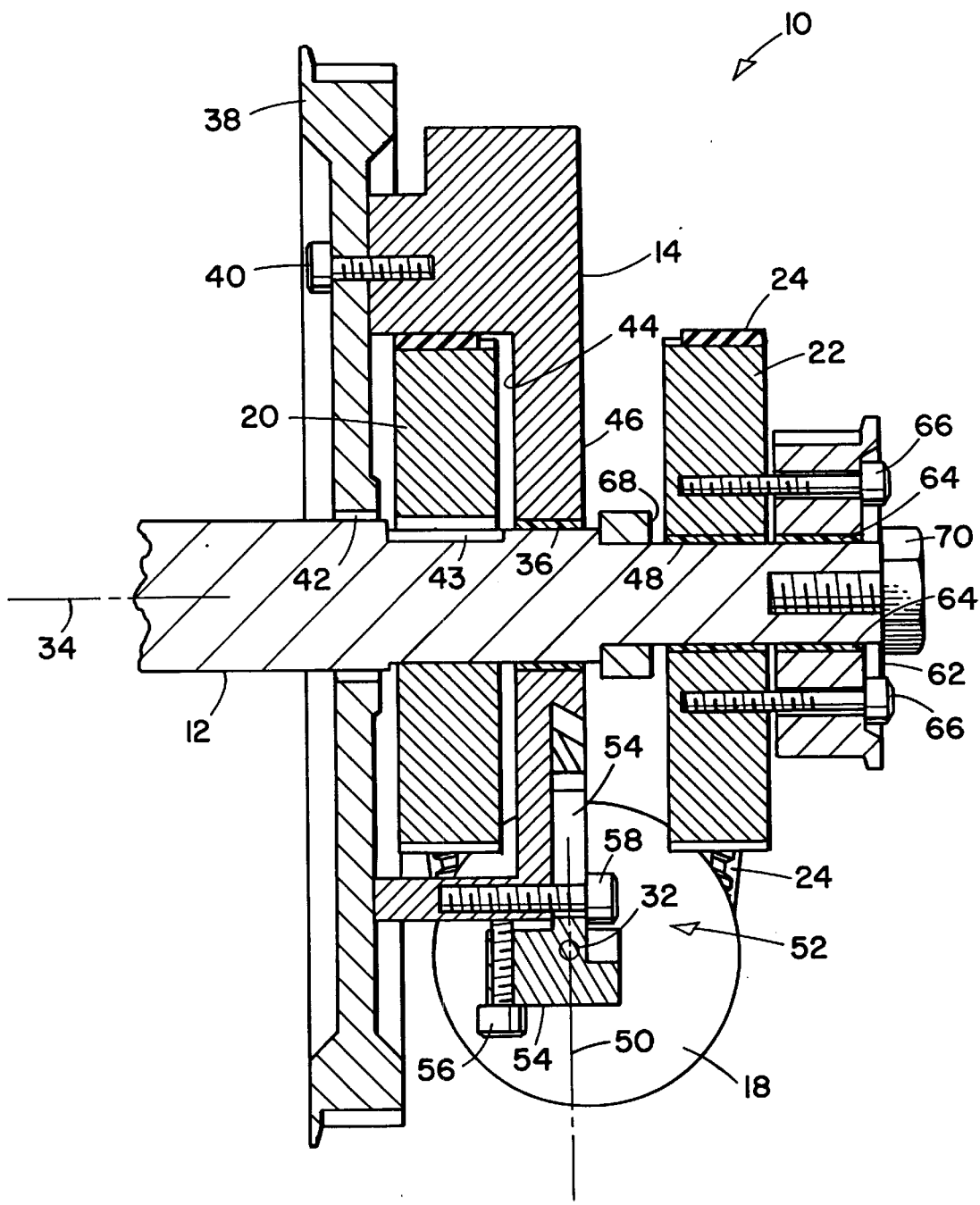

Referring to FIGS. 1 and 2, a belt drive differential 10 of the invention has an output shaft 12, a carrier 14, two planet sprockets 16, 18, two output sprockets 20, 22, and a toothed belt 24 entrained around the sprockets.

The planet sprockets, which may include flanges 26, 28, to help guide the belt, are rotatably mounted to the carrier on at least one shaft 30 having a planet axis 32. Optionally but preferably, the planet sprockets 16, 18, are coaxial with each other along the planet axis. With such a coaxial arrangement, the belt is substantially tangent to all sprockets across its width. However, the planet sprockets may be arranged with their axis at an angle to each other provided that the belt is substantially tangent to the sprockets across its width.

The carrier 14, and output shaft 12, have substantially the same, concentric axis 34. The carrier 14 is journaled to the output shaft such as by means of a plastic bushing 36. The carrier is thus free to rotate about the shaft to orbit the planet sprockets in a circular path about the carrier axis 34.

The carrier 14 is rotated about its axis 34 by means of an input wheel such as an input sprocket 38 attached to the carrier such as by means of threaded fasteners 40. The input sprocket is journaled to the output shaft such as by a plastic bushing 42. Thus, the carrier and attached input sprocket are free to rotate together around the output shaft.

One of the output sprockets 20 is attached to the output shaft 12 such as by means of a key 43 so that the output sprocket rotates with the output shaft. The output sprocket 20 is located juxtaposed an axially facing side 44 of the carrier. The other or second output sprocket 22 is located juxtaposed and oppositely facing side 46 of the carrier and is journaled to the output shaft 12 such as by means of a plastic bushing 48. Thus, the output sprocket 22 is free to rotate about the output shaft 12.

The pivot axis 32 is spaced from the carrier axis and is substantially perpendicular to the carrier axis in a radial plane 50. Optionally, but preferably, the carrier includes an adjustment mechanism 52 for radially moving the planet axis 32 in the radial plane for the purpose of establishing a fixed drive length for the belt when it is appropriately tensioned.

The adjustment mechanism 52 includes a movable carriage 54 to which the shaft(s) 30 are attached. The carriage is adjusted by rotating threaded fastener 56 which translates the pivot axis radially inward or radially outward with the carriage. The carriage is locked into its adjusted position by means of a threaded fastener 58.

A new synchronous or toothed belt needs to be pretensioned to compensate for a tension decay that occurs when a belt is operated for the first time under a load. The adjustment mechanism 52 facilitates the tensioning of the belt and establishing a fixed belt drive length that needs or requires little or no additional adjustment over the operating life of the belt.

A first drive sprocket 60 is attached to the output shaft to rotate therewith. A second drive sprocket 62 is journaled to the output shaft such as by means of a plastic bushing 64, and it is attached to a side of the output sprocket 22 such as by means of threaded fasteners 66. The second drive sprocket 62 along with output sprocket 22 is free to move axially along the output shaft a predetermined amount between stop 68 as a collar or washer placed over the output shaft, and a flanged stop such as a threaded fastener 70. The freedom of movement facilitates an automatic alignment of the belt and sprocket under load. The mass of the carrier may be increased 71 radially opposite the planet sprockets 16, 18, to provide a dynamic counterbalance to the radially off-set planet sprockets to inhibit vibration.

In use, the belt drive differential may be powered through the input sprocket by means of a synchronous belt 72 that engages and is entrained about a powered driver sprocket 74 and the input sprocket 38. Any means (not shown) such as an electric motor or internal combustion engine may be used to power the drive sprocket 74. The carrier 14 is attached to and rotates with and turns the same number of revolutions as the input sprocket 38. The planet sprockets 16, 18, pull on the belt 24 to rotate the output sprockets 20, 22 in the same direction of rotation as the carrier. The output sprockets 20, 22 turn with the same number of revolutions as the carrier provided that there is no differential speed requirement between the first drive sprocket 60 and second drive sprocket 62. The first drive sprocket 60 may be used to transmit power to a final drive sprocket 76 by means of an synchronous or toothed power transmission belt 78. Similarly, the second drive sprocket 62 may be used to power a second final drive sprocket 80 by means of an entrained synchronous belt 82.

The mule drive is activated when required and it permits the first drive sprocket and second drive sprocket to be operated at different rotational speeds. To explain, assume the input sprocket 38 is held stationary and the output shaft 12 is rotated one revolution clockwise. The output sprocket 20 being attached to the output shaft, also rotates one revolution in the clockwise direction. Rotation of the output sprocket 20 circulates the toothed belt 24 and the other output sprocket 22 in the opposite direction one revolution or counterclockwise as the sprocket is journaled to the output shaft. Simultaneously, the second drive sprocket 62 turns one revolution counter clockwise because it is directly attached to output sprocket 22.

By way of example, a belt drive differential with other belt drives as illustrated in FIG. 1 was constructed and satisfactorily operated. The configuration was as follows:

| | | |
|---|---|---|
| power drive sprocket 74 | 25 | teeth, 14 mm pitch |
| belt 72 | 124 | teeth, 14 mm pitch |
| input sprocket | 80 | teeth, 14 mm pitch |
| planet sprockets 16, 18 | 32 | teeth, 5 mm pitch |
| output sprockets 20, 22 | 61 | teeth, 5 mm pitch |
| belt 24 | 148 | teeth, 5 mm pitch |
| drive sprockets 60, 62 | 25 | teeth, 14 mm pitch |
| belts 78, 72 | 148 | teeth, 14 mm pitch |
| final drive sprockets 76, 80 | 80 | teeth, 14 mm pitch |
| power to sprocket 74 | | 2 hp, 0 to 4200 rpm |

The foregoing detailed description is made for purpose of illustration and is not intended to limit the scope of the appended claims.

What is claimed is:

1. A belt drive differential having at least two planet pulleys rotatably mounted to a carrier to orbit in a circular path with the carrier about a carrier axis and at least two output pulleys arranged coaxial with the carrier axis wherein at least one of the output pulleys is attached to an output shaft, and a belt entrained around the pulleys, wherein the improvement comprises:

the two planet pulleys being in the form of toothed planet sprockets that are spaced-apart with planet axes that are spaced from the carrier axis;

another of the output pulleys being journaled to the output shaft, and the two output pulleys, one being attached to the output shaft and the other being journaled to the output shaft, being in the form of toothed output sprockets and wherein the planet sprockets in conjunction with the output sprockets define a mule drive having a fixed belt drive length; and the belt being in the form of a synchronous belt with belt teeth that engage the toothed planet sprockets and toothed output sprockets and wherein the belt is substantially tangent to each of the sprockets across its width.

2. The belt drive differential as claimed in claim 1 wherein the belt has belt teeth of at least a 5 mm pitch, and the output sprockets each have at least 61 teeth, and the planet sprockets each have at least 32 teeth.

3. The belt drive differential as claimed in claim 1 wherein the carrier is attached to a side of a toothed input belt sprocket that is journaled with the output shaft.

4. The belt drive differential as claimed in claim 1 and further comprising a first drive sprocket attached to and rotatable with the output shaft and a second drive sprocket journaled to the output shaft and attached to and rotatable with the output sprocket journaled with the output shaft.

5. The belt drive differential as claimed in claim 1 wherein the output sprocket journaled to the output shaft is free to axially float on the output shaft a predetermined amount.

6. The belt drive sprocket as claimed in claim 5 wherein the planet sprockets are journaled and are free to axially float a predetermined amount relative to the planet axis.

7. The belt drive as claimed in claim 5 wherein the carrier is journaled to the output shaft between the output sprockets.

8. The belt drive as claimed in claim 1 wherein the planet pulleys axes are coaxial and spaced substantially perpendicular to the carrier axis.

9. A belt drive differential comprising
an output shaft;
a carrier journaled to the output shaft;
a first output sprocket attached to the output shaft juxtaposed an axially facing side of the carrier;
a second output sprocket journaled to the output shaft juxtaposed an opposite axially facing side of the carrier;
first and second spaced apart, planet sprockets coaxial to a planet axis and journaled to at least one shaft attached to the carrier and wherein the planet axis is spaced from and substantially perpendicular to the output shaft;
a toothed belt entrained around the first and second output sprockets and first and second planet sprockets;
a first drive sprocket attached to the output shaft; and
a second drive sprocket journaled to the output shaft and attached to the second output sprocket.

10. The belt drive differential as claimed in claim 9 wherein the carrier is attached to a side of an input sprocket journaled to the output shaft.

11. The belt drive differential as claimed in claim 10 wherein the carrier has an increased mass located in a direction radially opposite the planet sprockets and defines a counterbalance to the planet sprockets.

\* \* \* \* \*